(12) United States Patent
Lan

(10) Patent No.: US 12,455,600 B2
(45) Date of Patent: Oct. 28, 2025

(54) FIXING UNIT AND HEAT DISSIPATION DEVICE USING SAME

(71) Applicant: ASIA VITAL COMPONENTS CO., LTD., New Taipei (TW)

(72) Inventor: Wen-Ji Lan, New Taipei (TW)

(73) Assignee: ASIA VITAL COMPONENTS CO., LTD., New Taipei (TW)

(*) Notice: Subject to any disclaimer, the term of this patent is extended or adjusted under 35 U.S.C. 154(b) by 309 days.

(21) Appl. No.: 18/202,954

(22) Filed: May 29, 2023

(65) Prior Publication Data
US 2024/0402766 A1    Dec. 5, 2024

(51) Int. Cl.
*H01L 23/40* (2006.01)
*F16B 41/00* (2006.01)
(Continued)

(52) U.S. Cl.
CPC ............ *G06F 1/183* (2013.01); *G06F 1/20* (2013.01); *H01L 23/4006* (2013.01);
(Continued)

(58) Field of Classification Search
CPC ...... F16B 41/002; F16B 21/186; F16B 43/00; F16F 2226/04; H01L 2023/4087; H01L 23/4006; F16H 2226/04
(Continued)

(56) References Cited

U.S. PATENT DOCUMENTS 3,415,302 A * 12/1968 Beck .................... F16B 37/044
411/350
5,836,429 A * 11/1998 McGuire ............... F16D 65/091
188/78
(Continued)

FOREIGN PATENT DOCUMENTS

CN    101039564 A    9/2007
CN    211017061 U    7/2020
(Continued)

OTHER PUBLICATIONS

Search Report dated Mar. 4, 2025, issued by Taiwan Intellectual Property Office for counterpart invention application No. 112117161, 1 page.

*Primary Examiner* — Flemming Saether
(74) *Attorney, Agent, or Firm* — Bradley J. Thorson; DeWitt LLP

(57) ABSTRACT

Fixing units for connecting a heat dissipation device to a heat source are pre-mounted to four points on the former and respectively include a spring loaded screw having a spring fitted thereon and stopped by a retaining ring from moving down out of the spring loaded screw; a screw sleeve having the spring loaded screw received therein and being provided at an upper open end with two diametrically opposite notches; and a spring retainer fitted around the upper open end of the screw sleeve and having a pair of upward retaining plates, which are extended through the notches to abut on and compress the spring. To connect the heat dissipation device to the heat source, simply apply an external force or use a tool to release the retaining plates from the springs, and the released springs synchronously provide even forces to push the heat dissipation device against the heat source.

16 Claims, 7 Drawing Sheets

(51) Int. Cl.
*G06F 1/18* (2006.01)
*G06F 1/20* (2006.01)

(52) U.S. Cl.
CPC ......... *F16B 41/002* (2013.01); *F16F 2226/04* (2013.01); *H01L 2023/4087* (2013.01)

(58) Field of Classification Search
USPC ................. 411/999, 352, 353, 520, 521, 544
See application file for complete search history.

(56) References Cited

U.S. PATENT DOCUMENTS

| | | | | |
|---|---|---|---|---|
| 6,468,011 | B2 * | 10/2002 | Mayer | F16B 21/18 411/153 |
| 6,829,143 | B2 * | 12/2004 | Russell | H01L 23/4006 257/714 |
| 6,955,512 | B2 * | 10/2005 | Allen | H05K 7/14 211/26 |
| 7,164,583 | B2 * | 1/2007 | Lee | H01L 23/4093 174/16.3 |
| 10,943,848 | B1 * | 3/2021 | Yatskov | H01L 23/4006 |
| 11,268,909 | B2 * | 3/2022 | Gao | H01L 23/4006 |
| 2012/0195711 | A1 | 8/2012 | Chiu | |
| 2024/0401633 | A1 * | 12/2024 | Lan | F16B 41/002 |

FOREIGN PATENT DOCUMENTS

| | | |
|---|---|---|
| CN | 211951083 U | 11/2020 |
| TW | M646080 U | 9/2023 |

* cited by examiner

FIXING UNIT AND HEAT DISSIPATION DEVICE USING SAME

FIELD OF THE INVENTION

The present invention relates to a fixing unit, and more particularly, to a plurality of fixing units that apply synchronous and even downward forces to a heat dissipation device, allowing the latter to contact with a bare chip without damaging the bare chip or producing thermal resistance between them. The present invention also relates to a heat dissipation device using the above-described fixing unit.

BACKGROUND OF THE INVENTION

Nowadays, high performance and high power chips are used in electronic devices for the latter to provide highly enhanced computing power. The chip in processing data will produce a relatively high amount of heat to form a heat source. Conventionally, the chip is packaged or encapsulated to avoid the chip from being damaged. With the enhanced computing power thereof, the chip in processing data produces even more heat than ever before. However, the package of the chip adversely affects the produced heat from efficiently dissipating into outer environment. Therefore, many currently available chips are provided in the form of bare dies without any package to protect their surfaces. The non-packaged bare die has a non-smooth and convex surface and accordingly, has a relatively small and weak contact area between it and a heat dissipation device for heat exchange. Thus, the bare die is subjected to damage and breaking when the heat dissipation device is connected thereto.

Conventionally, to fix the heat dissipation device to a top of the heat source (i.e. the bare die), a plurality of fixing points on the heat dissipation device are sequentially screw tightened to the bare die one by one. Since the fixing points are not tightened synchronously, the heat dissipation device in contact with the heat source tends to be skewed relative to the latter. The bare die subjected to uneven distribution of pressure over it is easily broken and damaged.

Please refer to FIGS. 6 and 7, which show a conventional manner of fixing a heat dissipation device C to a heat source A in the form of a bare die. As shown, the bare die A is placed on a base D. Four corners of the base D correspondingly located outside the heat source A are provided with an internally threaded copper sleeve rod B each. The heat dissipation device C also has four holes C3 formed corresponding to the four copper sleeve rods B1 for a screw unit C1 to extend through each of the holes C3. Each of the screw units C1 has a spring C2 fitted therearound. To lay the heat dissipation device C to the top of the heat source A, the screw units C1 are sequentially threaded through the holes C3 into corresponding copper sleeve rods B1 one by one with a power screwdriver handled manually or by a mechanical arm. To shorten the fixing time on a production line and complete the fixing operation within a limited time period, each of the screw units C1 is fully tightened in one movement at a very quick speed. As soon as the screw unit C1 is fully tightened, the spring C2 fitted therearound is also compressed in a direction toward the heat source A. The screw units C1 individually tightened at a quick speed and the springs C2 quickly compressed toward the heat source A tend to result in uneven and asynchronous distribution of downward forces over four corners of the base D and accordingly the heat source A. And, the heat source A, i.e. the bare die, being fragile and breakable, is easily damaged under uneven force application thereto.

The bare die is so fragile that even downward forces must be synchronously applied by the heat dissipation device to the four corners of the base carrying the bare die to ensure successful fixing of the heat dissipation device to the top of the bare die. In the event the four corners of the base are subjected to unevenly and asynchronously applied forces from the heat dissipation device, warp of the bare die or the heat dissipation device might occur to cause incomplete contact and thermal resistance between the two parts. In some worse conditions, the warped bare die might become damaged and non-usable and the thermal resistance might lead to uneven heat distribution over or inactive heat conduction of the heat dissipation device.

It is therefore tried by the inventor to find ways to enable the heat dissipation device to apply even and synchronous forces to the heat source to ensure complete and close contact between them, to maintain proper binding force between the bare die and the heat dissipation device with reliable fixing unit, and to make the fixing unit repeatedly usable or adjustable.

SUMMARY OF THE INVENTION

To effectively solve the above problems, it is a primary object of the present invention to provide a fixing unit, a plurality of which can provide synchronous and even downward forces to fix a heat dissipation device to a top of a heat source without causing broken or damaged bare die, as would happen in the prior art screw units that are tightened one by one.

To achieve the above and other objects, the fixing unit provided by the present invention for connecting a heat dissipation device to a heat source includes a spring loaded screw, a screw sleeve, a spring retainer, and a release member.

The spring loaded screw is provided near a lower end with a retaining groove for receiving a retaining ring therein, and has a spring fitted on around it.

The spring has a top end and a bottom end. The bottom end of the spring is pressed against the retaining ring, such that the spring is limited from axially moving out of the spring loaded screw.

The screw sleeve has a first and a second open end and a receiving space defined between and communicable with the first and the second open end. The first open end of the screw sleeve is provided with two circumferentially spaced notches, and a joint section is formed on the screw sleeve below the two notches. The spring loaded screw is fitted in the receiving space of the screw sleeve.

The spring retainer defines an internal hole for externally fitting on around the screw sleeve above the joint section. The spring retainer includes a pair of retaining plates upward extended from a rim of the spring retainer, and each of the retaining plates has an opening formed thereon. The two retaining plates are correspondingly extended through the two notches into the receiving space of the screw sleeve to abut on the top end of the spring, such that the top end of the spring is limited by the retaining plates from releasing an elastic force.

The release member includes a main body, which has two radially outward expandable sections formed at a lower end thereof. The radially outward expandable sections are extendable through the openings on the retaining plates. When the release member is axially moved toward the spring retainer, the radially outward expandable sections push the retaining plates radially outward and force free ends of the retaining plates to move radially outward at the same time and accordingly no longer abut on the spring to release the latter from a compressed state.

To achieve the above and other objects, the present invention also provides a heat dissipation device that is connected to at least one heat source using a plurality of the above described fixing units. The heat dissipation device according to the present invention includes a heat dissipation main body.

On the heat dissipation main body, there is a heat receiving zone. Four corners outside the heat receiving zone are provided with a through hole each for the fixing units to mount thereto.

To connect the heat dissipation device to the heat source, first align the heat receiving zone on the heat dissipation main body with the heat source. The spring loaded screws of the fixing units respectively have an externally threaded end, which are then preliminarily screwed to a base having the heat source set thereon. At this point, the springs in the receiving spaces of the screw sleeves are still in the compressed state. When all the fixing units at four corners outside the heat receiving zone have been screwed to the base, the release members are operated for the radially outward expandable sections to push the retaining plates of the spring retainers radially outward toward the screw sleeves, so that the retaining plates are released from the top ends of the springs. In this manner, the springs can synchronously provide even downward forces to the four corners outside the heat receiving zone on the heat dissipation main body, allowing the heat dissipation main body to stably and closely contact with the heat source in the form of a bare die. Therefore, the bare die is not subjected to broken or collapsed edges due to uneven or excessive forces applied thereto, nor would heat resistance occur due to incomplete contact of the heat dissipation main body with the bare die. Further, the present invention can also avoid the condition of broken and damaged heat source (i.e. the bare die) caused by excessive downward forces applied thereto during the process of tightening the fixing units to the base.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof.

Figure 1:
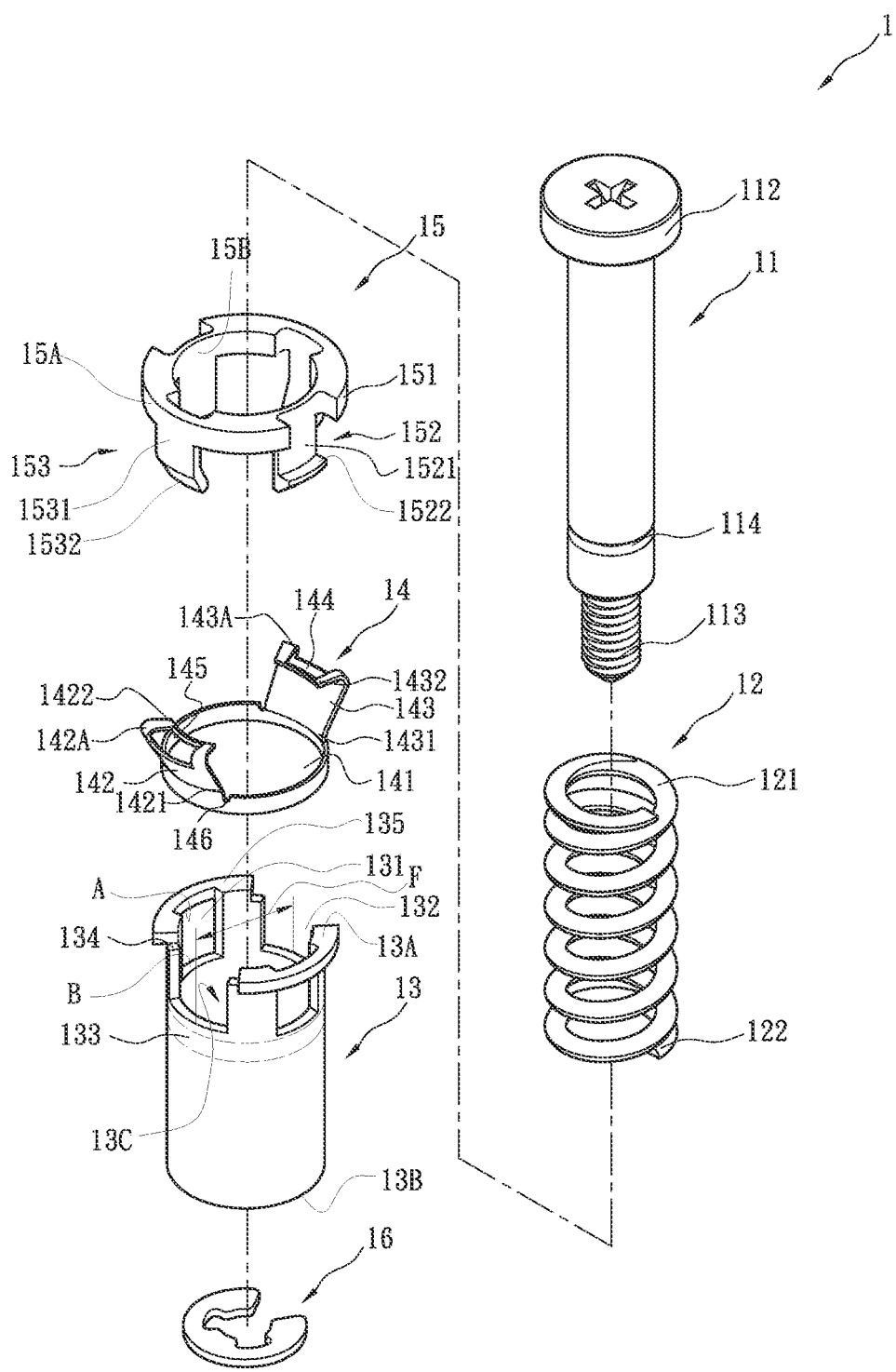
FIG. 1 is an exploded perspective view of a fixing unit according to the present invention.
Figure 2:
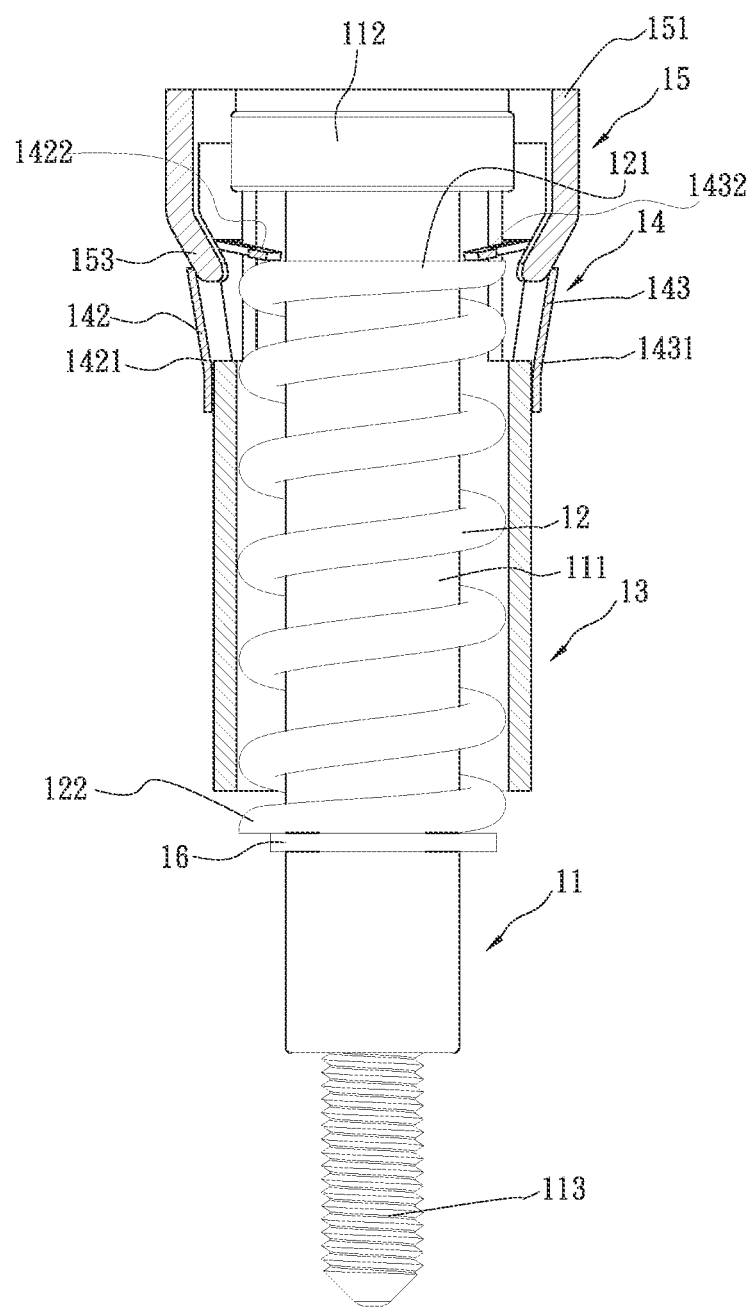
FIG. 2 is an assembled sectional view of the fixing unit of FIG. 1.
Figure 3:
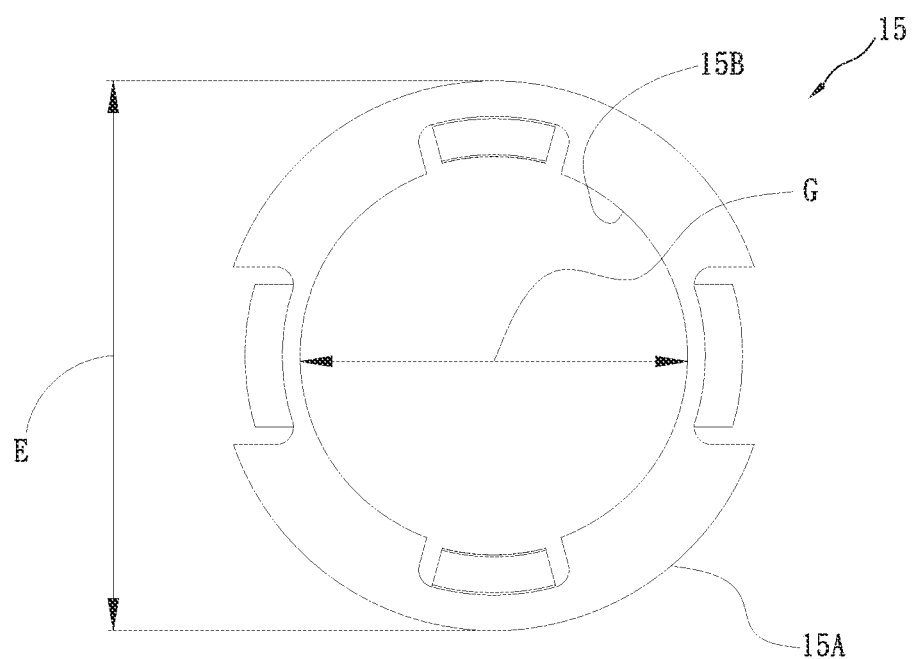
FIG. 3 is a top view of a release member included in the fixing unit of the present invention.

Please refer to FIGS. 1 and 2, which are exploded perspective view and assembled sectional view, respectively, of a fixing unit for heat dissipation device according to a preferred embodiment of the present invention, and to FIG. 3 that is a top view of a release member included in the fixing unit of the present invention. As shown, the fixing unit, being generally denoted a reference numeral 1, includes a spring loaded screw 11, a screw sleeve 13, a spring retainer 14, and a release member 15.

The spring loaded screw 11 has an upper end 11A and a lower end 11B. The upper end 11A defines a head 112 and the lower end 11B defines a plurality of male threads 113. The spring loaded screw 11 further includes at least one retaining groove 114 located at a distance above the male threads 113. The retaining groove 114 annularly extends around and is radially recessed from an outer circumferential surface of the spring loaded screw 11 for a retaining ring 16 to set therein. A spring 12 is fitted around the spring loaded screw 11 between the retaining groove 114 and the head 112 and includes a top end 121 and a bottom end 122. The bottom end 122 of the spring 12 is pressed against an upper side of the retaining ring 16. The retaining ring 16 limits the spring 12 to move axially on the spring loaded screw 11 only within a determined length, lest the spring 12 should move out of the spring loaded screw 11 from the lower end 11B. The retaining ring 16 can be a C-ring, an E-ring, or any other retaining ring with a suitable pattern. In the preferred embodiment of the present invention, the retaining ring 16 is non-restrictively illustrated as an E-ring.

The screw sleeve 13 has an upper and a lower end, which define a first open end 13A and a second open end 13B, respectively; and a receiving space 13C is defined between and communicable with the first and the second open end 13A, 13B. The first open end 13A of the screw sleeve 13 is provided with two cut openings 131 and two notches 132, which are alternately arranged, such that the two cut openings 131 are circumferentially spaced from each other by the two notches 132, and vice versa. The screw sleeve 13 further includes a joint section 133, which is located around an outer side of the first open end 13A closely below the notches 132. The joint section 133 can be in the form of an annular groove or an annular rib for axially holding the spring retainer 14 in place, lest the spring retainer 14 should move axially relative to or out of the screw sleeve 13. The spring loaded screw 11 is fitted in the receiving space 13C of the screw sleeve 13.

The spring retainer 14 is a ring-shaped member defining an internal hole 141 for fitting around the joint section 133 of the screw sleeve 13. The internal hole 141 of the spring retainer 14 can be configured to be loosely or tightly fitted around the screw sleeve 13. In the preferred embodiment, the spring retainer 14 is non-restrictively illustrated as being tightly fitted around the screw sleeve 13. The spring retainer 14 includes a pair of flexible retaining plates 142, 143, which are upward extended from a rim of the spring retainer 14 and circumferentially spaced from each other by 180 degrees to stand face to face. In other operable embodiments, the retaining plates 142, 143 can be three or four or more in number and equally spaced along the rim of the spring retainer 14. Each of the retaining plates 142, 143 has a fixed end 1421, 1431 and a free end 1422, 1432. The fixed ends 1421, 1431 are fixed to or integrally formed on the rim of the spring retainer 14. The retaining plates 142, 143 respectively have an upper portion bent and extended toward a center of the internal hole 141 by a length to form bent portions 142A, 143A. The free ends 1422, 1432 are located at distal ends of the bent portions 142A, 143A, respectively.

The screw sleeve 13 further includes two stepped sections 134 formed at the first open end 13A and respectively located adjacent to two upper lateral sides of the notches 132. The stepped sections 134 serve as supports, on which the radially inward bent portions 142A, 143A of the retaining plates 142, 143 are rest.

The retaining plates 142, 143 respectively have an opening 144, 145 formed thereon between the fixed ends 1421, 1431 and the free ends 1422, 1432. The free ends 1422, 1432 of the retaining plates 142, 143 extend into the receiving space 13C of the screw sleeve 13 via the notches 132 to fitly abut on the top end 121 of the spring 12, such that the spring 12 is stopped from releasing its elastic force in an axially upward direction. That is, the top end 121 of the spring 12 is temporarily stopped from pushing against a lower side of the head 112 of the spring loaded screw 11 and is in a compressed state. Further, locations on two lateral sides of the fixed ends 1421, 1431 of the retaining plates 142, 143 that are located adjacent to the rim of the spring retainer 14 are provided with a small cut 146 each. With the small cuts 146, the retaining plates 142, 143 can have a larger bending angle and higher tear strength to resist breaking.

The release member 15 includes a main body 151 having communicable upper and lower ends and an outer wall surface 15A and an inner wall surface 15B. The main body 151 has two axial guide sections 152 and two radially outward expandable sections 153 formed at the lower end. And, the axial guide sections 152 and the radially outward expandable sections 153 are alternately spaced along the lower end of the main body 151.

Each of the radially outward expandable sections 153 includes an extended portion 1531, and the two extended portions 1531 on the release member 15 are spaced from each other by 180 degrees. More specifically, the extended portions 1531 are axially downward extended from an edge of the outer wall surface 15A of the main body 151. Distal ends of the two extended portions 1531 are further bent toward a center of the main body 151 to form an inclined segment 1532 each. As shown in FIG. 3, a distance E is defined between the two extended portions 1531 of the two radially expandable sections 153. The distance E is larger than or equal to an outer diameter F of the screw sleeve 13 (see FIG. 1).

Each of the two axial guide sections 152 includes a vertical portion 1521, and the two vertical portions 1521 on the release member 15 are circumferentially spaced from each other by 180 degrees. More specifically, the vertical portions 1521 are downward extended from an edge of the inner wall surface 15B of the main body 151. Distal ends of the two vertical portions 1521 are radially outward extended to form a limiting segment 1522 each. As shown in FIG. 3, a distance G is defined between the two vertical portions 1521. The distance G is smaller than or equal to the outer diameter F of the screw sleeve 13.

The screw sleeve 13 further includes a pair of radially outward extended curved flanges 135, which are located at the first open end 13A of the screw sleeve 13 corresponding to the two cut openings 131. The two curved flanges 135 are circumferentially spaced from each other by 180 degrees. The cut openings 131 respectively have a depth extending from an outer wall surface to an inner wall surface of the screw sleeve 13 and a height upward extended to the curved flange 135 to thereby form two axial guide rails.

The cut openings 131 respectively have a first position A and a second position B, which are spaced in an axial direction of the screw sleeve 13. The first position A of each cut opening 131 is located adjacent to a lower side of the curved flange 135; and the second position B of each cut opening 131 is located at a lower end of the cut opening 131 adjacent to the screw sleeve 13. The first and the second position A, B respectively define a beginning and an ending position of each of the above-mentioned axial guide rails. The above-mentioned axial guide portions 152 of the release member 15 and the cut openings 131 of the screw sleeve 13 are engaged with and axially slidable relative to one another, and the axially upward displacement of the limiting segments 1522 of the axial guide portions 152 in the cut openings 131 is stopped when the limiting segments 1522 are abutted against the curved flanges 135. Therefore, the release member 15 is axially movable only between the first and the second positions A, B of the cut openings 131 without the risk of separating from the screw sleeve 13. The provision of the limiting segments 1522 and the curved flanges 135 also prevents the release member 15 from rotating relative to or deviating from the axial direction of the screw sleeve 13.

When the release member 15 is axially moved toward the screw sleeve 13, the radially outward expandable sections 153 are extended into the openings 145, 144 on the retaining plates 142, 143, respectively, to press against and push the retaining plates 142, 143 radially outward. Meanwhile, the free ends 1422, 1432 of the retaining plates 142, 143 are brought to move and expand radially outward relative to the screw sleeve 13. At this point, the free ends 1422, 1432 of the retaining plates 142, 143 no longer press against the top end 121 of the spring 12, and the spring 12 is released from the compressed state.

Figure 4:
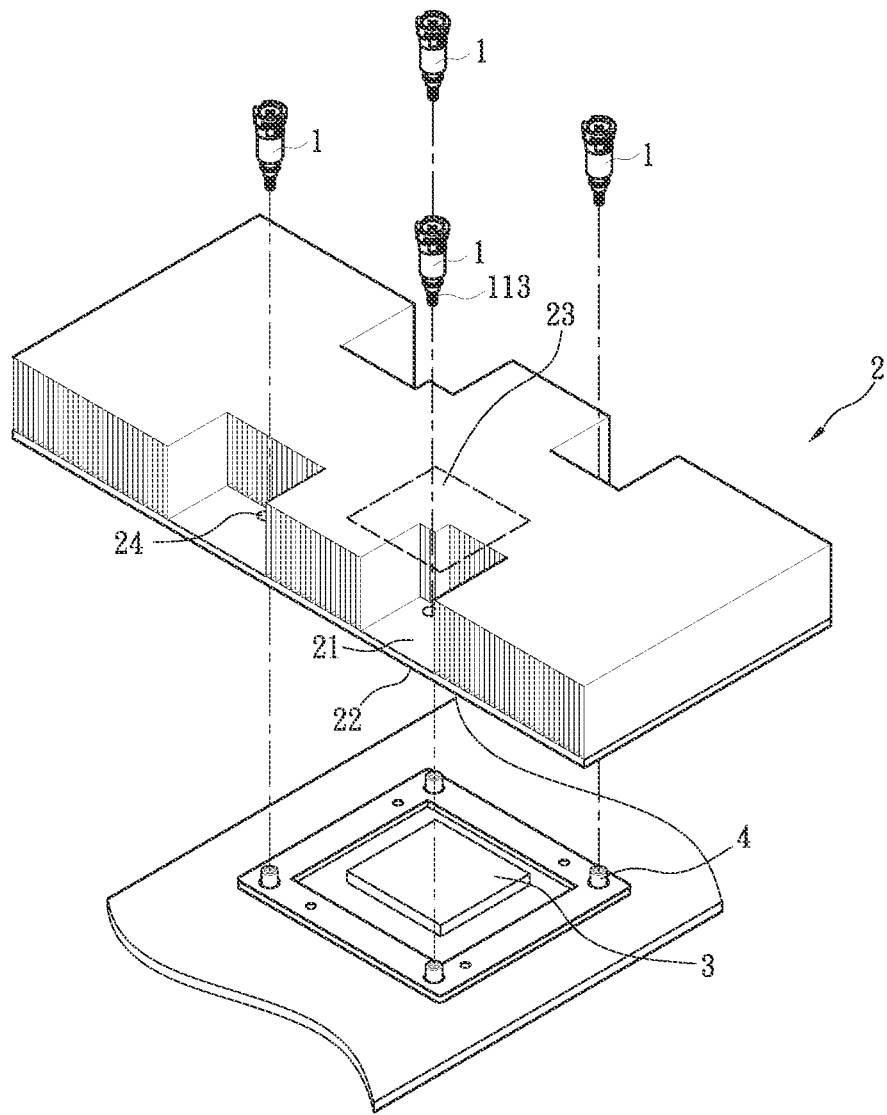
FIG. 4 shows a heat dissipation device according to the present invention and the use of the fixing units of the present invention to connect the heat dissipation device to a heat source.
Figure 5:
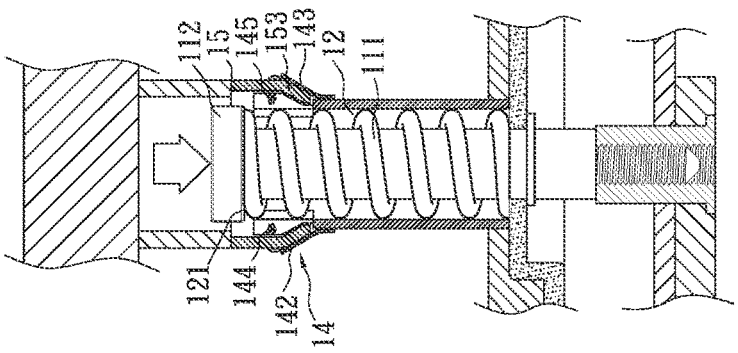
FIG. 5 pictorially shows how the fixing unit of the present invention connects a heat dissipation device to a holding structure provided on a base carrying a heat source thereon.
Figure 5:
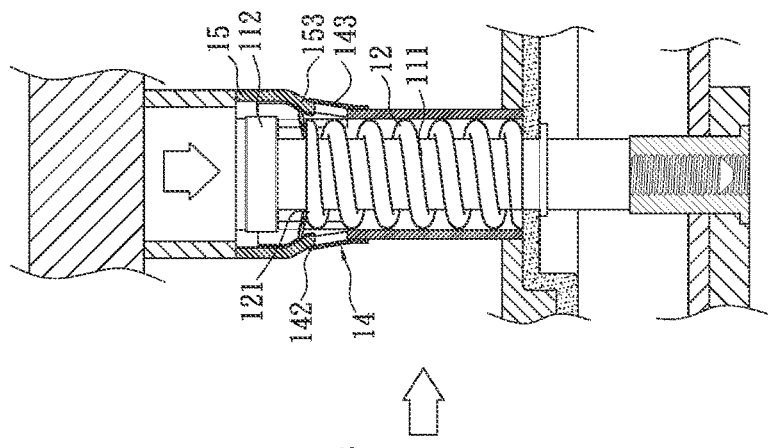
Figure 5:
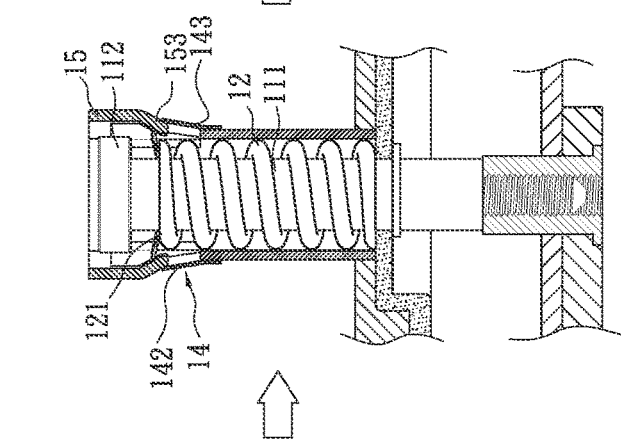
Figure 5:
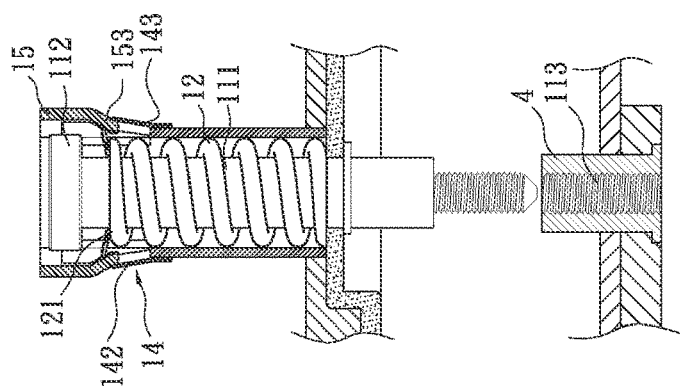
Figure 6:
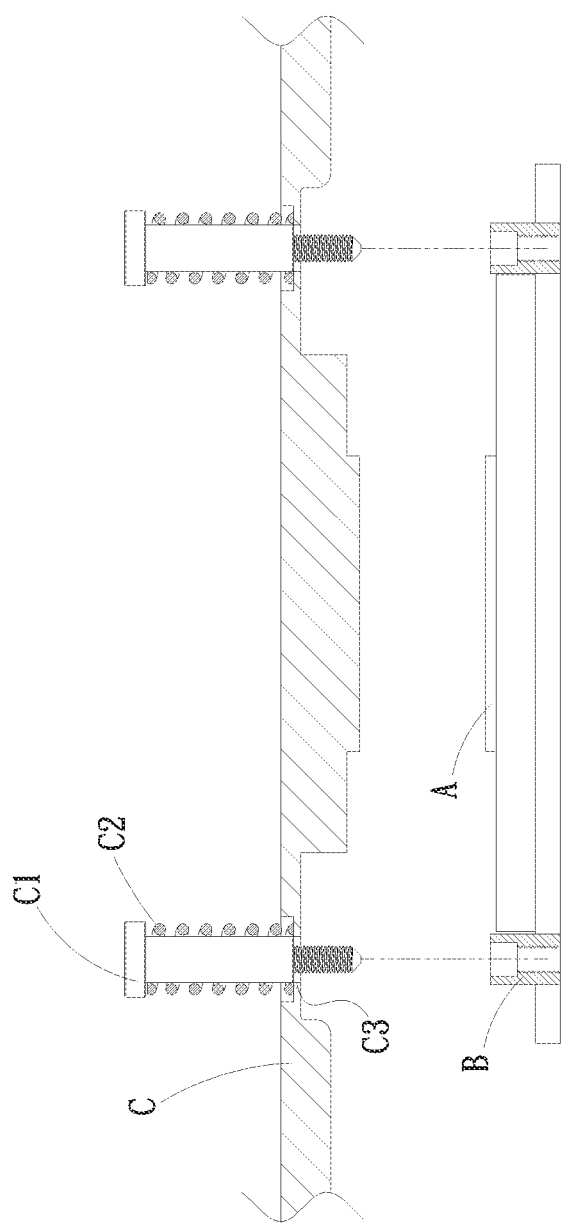
FIG. 6 shows how a heat dissipation device is connected to a heat source in the prior art.
Figure 7:
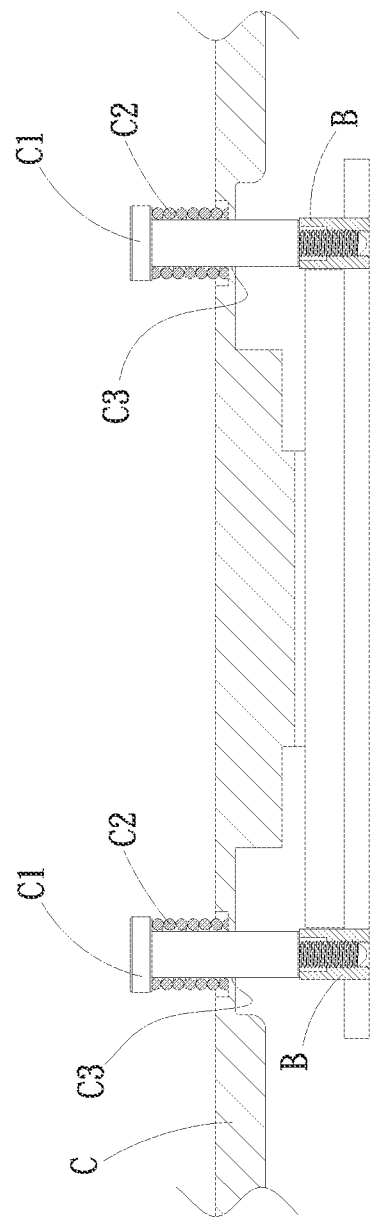
FIG. 7 shows the heat dissipation device and the heat source of FIG. 6 after being connected to each other.

Please refer to FIG. 4, which shows a heat dissipation device according to the present invention, and to FIG. 5, which shows how the fixing unit 1 of the present invention is extended through the heat dissipation device and connected to a base having a heat source 3 provided thereon. As shown, the heat dissipation device of the present invention includes a heat dissipation main body 2 and a plurality of fixing units 1.

The heat dissipation main body 2 has a first side 21, an opposite second side 22, and a heat receiving zone 23. A plurality of through holes 24 is provided at four corners outside the heat receiving zone 23 to extend from the first side 21 to the second side 22 of the heat dissipation main body 2. The heat dissipation main body 2 can be a vapor chamber, a heat sink, or a heat conductor without being particularly limited. The fixing unit 1 is structurally the same as the above described and illustrated one and is not repeatedly described herein.

To use the fixing unit 1, first extend the end of the spring loaded screw 11 having the male threads 113 into a corresponding through hole 24 on the heat dissipation main body 2. Then, fit the retaining ring 16 in the retaining groove 114 of the spring loaded screw 11 with upper side of the retaining ring 16 flatly attached to the second side 22 of the heat dissipation main body 2, such that the spring loaded screw 11 could not be pulled upward to separate from the through hole 24. At this point, the second open end 13B of the screw sleeve 13 externally fitted around the spring loaded screw 11 and the bottom end 122 of the spring 12 are pressed against the first side 21 of the heat dissipation main body 2. In an alternative embodiment, the screw sleeve 13 can be integrally formed on the first side 21 of the heat dissipation main body 2. In this case, other parts of the fixing unit 1 can be sequentially inserted into or fitted on around the screw sleeve 13.

The spring retainer 14 is fitted on around the joint section 133 of the screw sleeve 13, such that the free ends 1422, 1432 of the retaining plates 142, 143 of the spring retainer 14 are abutted on the top end 121 of the spring 12 and the spring 12 is temporarily held in an elastically compressed state. When the fixing units 1 in the above assembled condition have been mounted to four corners outside the heat receiving zone 23 on the heat dissipation main body 2 but are not yet connected to the heat source 3, it can still be assured the fixing units 1 would not fall off from the heat dissipation main body 2 while the latter is being moved or transported. The fixing units 1 in the above assembled condition and pre-mounted to four corners outside the heat receiving zone 23 of the heat dissipation main body 2 may also enable the connection of the heat dissipation main body 2 to the heat source 3 at an increased speed and efficiency on the production line.

To connect the heat dissipation device to the heat source 3 to enable heat exchange between them, since the spring loaded screws 11 have already been mounted to four corners outside the heat receiving zone 23 on the heat dissipation main body 2, it is able to proceed with a preliminary tightening of the male threads 113 of the spring loaded screws 11 to a plurality of corresponding holding structures 4, such as internally threaded hollow screw rods, provided on a base having the heat source 3 set thereon. At this point, since the springs 12 fitted on around the spring loaded screws 11 in the screw sleeves 13 are still in the elastically compressed state, the heat dissipation device 2 is simply held in place above the heat source 3 without applying any downward force on the heat source 3. That is, the heat receiving zone 23 on the second side 22 of the heat dissipation main body 2 is only in slight contact with a top surface of the heat source 3.

The fixing unit 1 of the present invention can be tightened to the heat dissipation main body 2 and the base having the heat source 3 placed thereon by applying an external force to it in an automated manner using a mechanical apparatus or by handling it manually by operators at working site using hand tools. Any other suitable way may also be accepted to assist in the tightening of the fixing unit 1.

In the illustrated preferred embodiment, a predetermined apparatus 5 is used to provide a downward force. The apparatus 5 can be used alone to apply the downward force directly, or can be used along with a tool (not shown) to apply an external force to the release member 15. The apparatus 5 includes four push sections 51, which are located corresponding to the fixing units 1 mounted to four corners outside the heat dissipation zone 23 of the heat dissipation main body 2 and are abutted on upper ends of the release members 15 of the fixing units 1 simultaneously. When the apparatus 5 is moved downward, the push sections 51 apply forces to the release members 15 at the same time, forcing the release members 15 to move downward toward corresponding spring retainers 14. When the radially outward expandable sections 153 of the release members 15 are brought to move down into the corresponding openings 145, 144 on the retaining plates 142, 143 of the spring retainers 14, the retaining plates 142, 143 are forced to move and expand radially outward relative to the screw sleeves 13, such that the free ends 1422, 1432 of the retaining plates 142, 143 no longer abut on the top ends 121 of the springs 12, and the original compressed springs 12 are now able to fully release their elastic force. At this point, the top ends 121 of the springs 12 push against the lower side of the heads 112 of the spring loaded screws 11 while the bottom ends 122 of the springs 12 of the fixing units 1 simultaneously apply even downward forces to the four corners outside the heat receiving zone 23 on the heat dissipation main body 2.

In the present invention, the spring loaded screws 11 are pre-mounted to the heat dissipation main body 2 for the latter to lie above the heat source 3 without applying any force to the heat source 3. It is the springs 12 externally fitted around the spring loaded screws 11 that enable the heat dissipation main body 2 to move downward against the heat source 3. When the springs 12 fitted on around the fixing units 1 mounted to four corners outside the heat receiving zone 23 of the heat dissipation main body 2 are released from the spring retainers 14 at the same time, the springs 12 synchronously provide even downward forces to the four corners outside the heat receiving zone 23, such that the heat dissipation main body 2 is moved downward stably to closely contact with the heat source 3 that is in the form of a bare die. In this manner, the bare die 3 is not subjected to broken or collapsed edges due to uneven or excessive forces applied thereto, nor would heat resistance occur due to incomplete contact of the heat dissipation main body 2 with the bare die 3. Further, the present invention can also avoid the condition of broken and damaged heat source (i.e. the bare die) caused by excessive downward forces during the process of tightening the fixing units 1 to the base. In brief, with the fixing unit 1 of the present invention, it is able to overcome the disadvantage in the prior art that the fixing points are individually tightened one by one to possibly result in the application of uneven forces or excessive spring pushing forces against the bare die to cause warped or broken bare die.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fixing unit, comprising:
a spring loaded screw having at least one annular retaining groove formed near a lower end thereof for receiving a retaining ring therein; and the spring loaded screw further having a spring fitted on around it with a bottom end of the spring pressed against the retaining ring;
a screw sleeve having a first and a second open end and a receiving space defined between and communicable with the first and the second open end; the first open end of the screw sleeve being provided with two circumferentially spaced notches, and two stepped sections being separately formed on two upper lateral sides of each of the notches; the second open end of the screw sleeve being configured to be mounted on a first side of a heat dissipation main body; and the spring loaded screw being fitted in the receiving space of the screw sleeve;
a spring retainer axially fixed to the screw sleeve and defining an internal hole for externally fitting on around the screw sleeve; the spring retainer including a pair of retaining plates upward extended from a rim of the spring retainer, and distal ends of the retaining plates being radially bent toward the internal hole of the spring retainer to form bent portions for temporarily abutting on the stepped sections of the screw sleeve during assembly so that the stepped sections support the bent portions, align the spring retainer with the screw sleeve, prevent rotation of the spring retainer, and temporarily limit a position of a top end of the spring; the retaining plates respectively having an opening formed thereon; and the bent portions of the retaining plates being extended into the receiving space of the screw sleeve via the notches on the screw sleeve to thereby abut on a top end of the spring such that the spring is temporarily held between the retaining ring and the bent portions of the retaining plates, wherein the bent portions of the retaining plates are shiftable to no longer abut on the top end of the spring.

2. The fixing unit as claimed in claim 1, wherein the screw sleeve further includes a joint section, which is located on around an outer side of the screw sleeve closely below the notches; and the joint section being one of an annular groove and an annular rib for axially holding the spring retainer thereto.

3. The fixing unit as claimed in claim 1, wherein the retaining plates respectively have a fixed end and a free end; the fixed ends being connected to the spring retainer while the free ends are located at the distal ends of the retaining plates; and locations on two lateral sides of the fixed ends of the retaining plates that are located adjacent to the spring retainer being provided with a small cut each, and the small cuts enabling the retaining plates to have an increased bending angle.

4. The fixing unit as claimed in claim 1, wherein the first open end of the screw sleeve is further formed with two cut openings; the cut openings and the notches being alternately arranged to be circumferentially spaced from one another; the first open end of the screw sleeve further including a pair of radially outward extended curved flanges, which are located corresponding to the two cut openings to therefore space from each other by 180 degrees; the cut openings respectively extending through the screw sleeve in a wall thickness direction thereof and having a height upward extended to the curved flange to thereby form two axial guide rails; and the cut openings respectively having a first position and a second position, which are spaced in an axial direction of the screw sleeve.

5. The fixing unit as claimed in claim 4, further comprising a release member, which includes a main body having an outer wall surface and an inner wall surface; the main body of the release member being formed with two radially outward expandable sections, which are extendable through the openings on the retaining plates into the receiving space of the screw sleeve and respectively include an extended portion; the two extended portions on the release member being circumferentially spaced from each other by 180 degrees and being axially downward extended from an edge of the outer wall surface of the main body of the release member; and distal ends of the two extended portions being further bent toward a center of the main body to form an inclined segment each.

6. The fixing unit as claimed in claim 5, wherein the release member further includes two axial guide sections; the axial guide sections and the radially outward expandable sections being alternately spaced along the main body of the release member; the axial guide sections respectively including a vertical portion; the two vertical portions on the release member being circumferentially spaced from each other by 180 degrees and being axially downward extended from an edge of the inner wall surface of the main body of the release member; and distal ends of the two vertical portions further extended radially outward to form a limiting segment each.

7. The fixing unit as claimed in claim 1, further comprising a release member, which includes a main body having an outer wall surface and an inner wall surface; the main body of the release member being formed with two radially outward expandable sections, which are extendable through the openings on the retaining plates into the receiving space of the screw sleeve and respectively include an extended portion; the two extended portions on the release member being circumferentially spaced from each other by 180 degrees and being axially downward extended from an edge of the outer wall surface of the main body of the release member; and distal ends of the two extended portions being further bent toward a center of the main body to form an inclined segment each.

8. The fixing unit as claimed in claim 7, wherein the release member further includes two axial guide sections; the axial guide sections and the radially outward expandable sections being alternately spaced along the main body of the release member; the axial guide sections respectively including a vertical portion; the two vertical portions on the release member being circumferentially spaced from each other by 180 degrees and being axially downward extended from an edge of the inner wall surface of the main body of the release member; and distal ends of the two vertical portions further extended radially outward to form a limiting segment each.

9. A heat dissipation device with fixing units, comprising:
a heat dissipation main body having a first side, an opposite second side, and a heat receiving zone; the heat dissipation main body being provided at four corners outside the heat receiving zone with a plurality of through holes; and the through holes being extended from the first side to the second side of the heat dissipation main body; and
a plurality of fixing units correspondingly mounted to the through holes on the heat dissipation main body, and each of the fixing units including:
a spring loaded screw having at least one annular retaining groove formed near a lower end thereof for receiving a retaining ring therein and a spring fitted on around the spring loaded screw; a bottom end of the spring and one side surface of the retaining ring being pressed against the first and the second side of the heat dissipation main body, respectively;
a screw sleeve having a first and a second open end and a receiving space defined between and communicable with the first and the second open end; the first open end of the screw sleeve being provided with two circumferentially spaced notches, and two stepped sections being separately formed on two upper lateral sides of each of the notches; the second open end of the screw sleeve being mounted on a first side of the heat dissipation main body; and the spring loaded screw being fitted in the receiving space of the screw sleeve;
a spring retainer axially fixed to the screw sleeve and defining an internal hole for externally fitting on around the screw sleeve; the spring retainer including a pair of retaining plates upward extended from a rim of the spring retainer, and distal ends of the retaining plates being radially bent toward the internal hole of the spring retainer to form bent portions for temporarily abutting on the stepped sections of the screw sleeve during assembly so that the stepped sections support the bent portions, align the spring retainer with the screw sleeve, prevent rotation of the spring retainer, and temporarily limit a position of a top end of the spring; the retaining plates respectively having an opening formed thereon; and the bent portions of the retaining plates being extended into the receiving space of the screw sleeve via the notches on the screw sleeve to thereby abut on a top end of the spring such that the spring is temporarily held between the retaining ring and the bent portions of the retaining plates, wherein the bent portions of the retaining plates are shiftable to no longer abut on the top end of the spring.

10. The heat dissipation device with fixing units as claimed in claim 9, wherein the screw sleeve further includes a joint section, which is located on around an outer side of the screw sleeve closely below the notches; and the joint section being one of an annular groove and an annular rib for axially holding the spring retainer thereto.

11. The heat dissipation device with fixing units as claimed in claim 9, wherein the retaining plates respectively have a fixed end and a free end; the fixed ends being connected to the spring retainer while the free ends are located at the distal ends of the retaining plates; and locations on two lateral sides of the fixed ends of the retaining plates that are located adjacent to the spring retainer being provided with a small cut each, and the small cuts enabling the retaining plates to have an increased bending angle.

12. The heat dissipation device with fixing units as claimed in claim 9, wherein the first open end of the screw sleeve is further formed with two cut openings; the cut openings and the notches being alternately arranged to be circumferentially spaced from one another; the first open end of the screw sleeve further including a pair of radially outward extended curved flanges, which are located corresponding to the two cut openings to therefore space from each other by 180 degrees; the cut openings respectively extending through the screw sleeve in a wall thickness direction thereof and having a height upward extended to the curved flange to thereby form two axial guide rails; and the cut openings respectively having a first position and a second position, which are spaced in an axial direction of the screw sleeve.

13. The heat dissipation device with fixing units as claimed in claim 12, wherein each of the fixing units further includes a release member, which includes a main body having an outer wall surface and an inner wall surface; the main body of the release member being formed with two radially outward expandable sections, which are extendable through the openings on the retaining plates into the receiving space of the screw sleeve and respectively include an extended portion; the two extended portions on the release member being circumferentially spaced from each other by 180 degrees and being axially downward extended from an edge of the outer wall surface of the main body of the release member; and distal ends of the two extended portions being further bent toward a center of the main body to form an inclined segment each.

14. The heat dissipation device with fixing units as claimed in claim 9, wherein each of the fixing units further includes a release member, which includes a main body having an outer wall surface and an inner wall surface; the main body of the release member being formed with two radially outward expandable sections, which are extendable through the openings on the retaining plates into the receiving space of the screw sleeve and respectively include an extended portion; the two extended portions on the release member being circumferentially spaced from each other by 180 degrees and being axially downward extended from an edge of the outer wall surface of the main body of the release member; and distal ends of the two extended portions being further bent toward a center of the main body to form an inclined segment each.

15. The heat dissipation device with fixing units as claimed in claim 14, wherein the release member further includes two axial guide sections; the axial guide sections and the radially outward expandable sections being alternately spaced along the main body of the release member; the axial guide sections respectively including a vertical portion; the two vertical portions on the release member being circumferentially spaced from each other by 180 degrees and being axially downward extended from an edge of the inner wall surface of the main body of the release member; and distal ends of the two vertical portions further extended radially outward to form a limiting segment each.

16. The heat dissipation device with fixing units as claimed in claim 9, wherein the screw sleeve is integrally extended upward from the first side of the heat dissipation main body.

* * * * *